(12) United States Patent
McBrearty et al.

(10) Patent No.: US 10,962,576 B2
(45) Date of Patent: Mar. 30, 2021

(54) ESTIMATION OF SHADING LOSSES FOR PHOTOVOLTAIC SYSTEMS FROM MEASURED AND MODELED INPUTS

(71) Applicant: Locus Energy, Inc., Hoboken, NJ (US)

(72) Inventors: Charles McBrearty, San Francisco, CA (US); Shawn Kerrigan, Redwood City, CA (US); Michael Herzig, Leonia, NJ (US)

(73) Assignee: LOCUS ENERGY, INC., Hoboken, NJ (US)

( * ) Notice: Subject to any disclaimer, the term of this patent is extended or adjusted under 35 U.S.C. 154(b) by 320 days.

(21) Appl. No.: 15/910,166

(22) Filed: Mar. 2, 2018

(65) Prior Publication Data

US 2018/0188301 A1    Jul. 5, 2018

Related U.S. Application Data

(63) Continuation-in-part of application No. 13/729,066, filed on Dec. 28, 2012, now abandoned.

(Continued)

(51) Int. Cl.
*G01R 22/10* (2006.01)
*G01W 1/12* (2006.01)
(Continued)

(52) U.S. Cl.
CPC ............... *G01R 22/10* (2013.01); *G01W 1/12* (2013.01); *G06N 3/08* (2013.01); *G06Q 10/04* (2013.01); *G06F 30/20* (2020.01); *G06F 2119/06* (2020.01); *G06Q 50/06* (2013.01); *Y02E 10/56* (2013.01)

(58) Field of Classification Search
CPC ...... G06F 30/20; G06F 2119/06; H02J 3/383; H02S 50/10; H02S 50/00; H02S 99/00; G06Q 10/04; G06Q 50/06; Y02E 10/563; Y02E 60/76; Y04S 40/22
See application file for complete search history.

(56) References Cited

U.S. PATENT DOCUMENTS

| 3,872,286 A | 3/1975 | Putman |
| 4,280,061 A | 7/1981 | Lawson-Tancred |

(Continued)

FOREIGN PATENT DOCUMENTS

| WO | WO 02/25987 | 3/2002 |
| WO | WO 2006/119031 | 11/2006 |

OTHER PUBLICATIONS

Official Action for U.S. Appl. No. 13/726,066 dated May 16, 2019, 37 pages.

(Continued)

*Primary Examiner* — Alexander Satanovsky
*Assistant Examiner* — Mark I Crohn
(74) *Attorney, Agent, or Firm* — Sheridan Ross P.C.

(57) ABSTRACT

The present invention provides methods and systems to estimate energy losses due to shading in PV systems from data including the measured energy and power produced over the lifetime of the system, the system size and configuration data, the weather conditions (including irradiance, ambient & panel temperature, and wind conditions) over the lifetime of the system, and derived meteorological condition information (e.g., decomposed irradiance values at any time).

20 Claims, 8 Drawing Sheets

| timestamp | modeled power (W) | modeled energy (Wh) |
|---|---|---|
| 2015-1-1 12:00 | 600 | 10 |
| 2015-1-1 12:05 | 660 | 11 |
| 2015-1-1 12:10 | 540 | 9 |

Related U.S. Application Data

(60) Provisional application No. 62/473,518, filed on Mar. 20, 2017.

(51) Int. Cl.
  G06Q 10/04 (2012.01)
  G06N 3/08 (2006.01)
  G06Q 50/06 (2012.01)
  G06F 30/20 (2020.01)
  G06F 119/06 (2020.01)

(56) References Cited

U.S. PATENT DOCUMENTS

| | | | |
|---|---|---|---|
| 4,752,697 | A | 6/1988 | Lyons et al. |
| 5,712,572 | A | 1/1998 | Tamechika et al. |
| 6,311,137 | B1 | 10/2001 | Kurokami et al. |
| 6,425,248 | B1 | 7/2002 | Tonomura et al. |
| 7,020,566 | B2 | 3/2006 | Villicana et al. |
| 7,133,787 | B2 | 11/2006 | Mizumaki |
| 7,336,201 | B2 | 2/2008 | Green et al. |
| 7,742,897 | B2 | 6/2010 | Herzig |
| 8,106,543 | B2 | 1/2012 | Huang et al. |
| 8,115,096 | B2 | 2/2012 | Shan et al. |
| 8,269,374 | B2 | 9/2012 | De Caires |
| 8,373,312 | B2 | 2/2013 | O'Brien et al. |
| 8,682,585 | B1 | 3/2014 | Hoff |
| 8,725,437 | B2 | 5/2014 | Caine |
| 8,738,328 | B2 | 5/2014 | Herzig et al. |
| 9,660,574 | B2 | 5/2017 | Caine |
| 2002/0059035 | A1 | 5/2002 | Yagi et al. |
| 2002/0143693 | A1 | 10/2002 | Soestbergen et al. |
| 2004/0067746 | A1 | 4/2004 | Johnson |
| 2004/0103056 | A1 | 5/2004 | Ikeda et al. |
| 2004/0138977 | A1 | 7/2004 | Tomkins et al. |
| 2004/0148336 | A1 | 7/2004 | Hubbard et al. |
| 2004/0176965 | A1 | 9/2004 | Winch et al. |
| 2004/0177027 | A1 | 9/2004 | Adachi |
| 2004/0230377 | A1 | 11/2004 | Ghosh et al. |
| 2004/0236587 | A1 | 11/2004 | Nalawade |
| 2005/0004839 | A1 | 1/2005 | Bakker et al. |
| 2005/0039787 | A1 | 2/2005 | Bing |
| 2005/0131810 | A1 | 6/2005 | Garrett |
| 2006/0271214 | A1 | 11/2006 | Brown |
| 2007/0162367 | A1 | 7/2007 | Smith et al. |
| 2007/0174219 | A1 | 7/2007 | Bryan et al. |
| 2007/0203860 | A1 | 8/2007 | Golden et al. |
| 2007/0219932 | A1 | 9/2007 | Carroll et al. |
| 2007/0226163 | A1 | 9/2007 | Robles |
| 2008/0091590 | A1 | 4/2008 | Kremen |
| 2008/0091625 | A1 | 4/2008 | Kremen |
| 2008/0172256 | A1 | 7/2008 | Yekutiely |
| 2008/0215500 | A1 | 9/2008 | De La Motte |
| 2009/0177458 | A1 | 7/2009 | Hochart et al. |
| 2009/0222224 | A1 | 9/2009 | Lewis et al. |
| 2010/0174643 | A1 | 7/2010 | Schaefer et al. |
| 2010/0185337 | A1 | 7/2010 | Le Pivert |
| 2010/0219983 | A1 | 9/2010 | Peleg et al. |
| 2010/0271222 | A1 | 10/2010 | Kerrigan et al. |
| 2011/0066401 | A1 | 3/2011 | Yang et al. |
| 2011/0184583 | A1 | 7/2011 | El-Barbari et al. |
| 2011/0210610 | A1 | 9/2011 | Mitsuoka et al. |
| 2011/0282601 | A1 | 11/2011 | Hoff |
| 2013/0085885 | A1 | 4/2013 | Sahai et al. |
| 2013/0264884 | A1 | 10/2013 | Kuo et al. |
| 2014/0018969 | A1 | 1/2014 | Forbes |
| 2014/0188410 | A1* | 7/2014 | Kerrigan ............... H02J 3/383 702/61 |
| 2015/0012258 | A1 | 1/2015 | Caine |
| 2015/0123798 | A1 | 5/2015 | Boross et al. |
| 2015/0188415 | A1 | 7/2015 | Abido et al. |
| 2016/0190984 | A1* | 6/2016 | Caine ................... H02S 50/00 702/60 |
| 2017/0286838 | A1* | 10/2017 | Cipriani ............... G06N 20/00 |
| 2018/0073980 | A1 | 3/2018 | Caine |
| 2018/0196092 | A1 | 7/2018 | McBrearty et al. |
| 2018/0196901 | A1 | 7/2018 | McBrearty et al. |

OTHER PUBLICATIONS

"Atlas DCA," Peak Electronic Design, Ltd., 2008.
"CM21 Precision Pyranometer Instruction Manual," Kipp & Zonen, 2004, version 1004, 66 pages.
"PVIQ Performance Analysis," Locus Energy, Oct. 2013, 11 pages [retrieved from: http://locusenergy.com/wp-content/uploads/2013/10/Locus-Energy-PVIQ-Performance-Analysis-White-Paper.pdf].
"Pyranometer Model SP-110 and SP-230 Owner's Manual," Apogee Instruments, Inc., 2013, 18 pages.
Burger et al., "Asset Securitisation," 2006, pp. 1-67.
Chaouachi et al. "A novel multi-model neuro-fuzzy-based MPPT for three-phase grid-connected photovoltaic system," Solar Energy, 2010, vol. 84, pp. 2219-2229.
Geuder et al. Long-term Behavior, Accuracy and Drift of LI-200 Pyranometers as Radiation Sensors in Rotating Shadowband Irradiometers (RSI), Energy Procedia, Dec. 2014, vol. 49, pp. 2330-2339.
Hammer et al., "Solar energy assessment using remote sensing technologies," Remote Sensing of Environment, vol. 86, 2003, pp. 423-432.
Kroposki et al., "Photovoltaic module energy rating methodology development," 25th PVSC, May 13-17, 1996, pp. 1311-1314.
Li et al., "Determining the Optimum Tilt Angle and Orientation for Solar Energy Collection Based on Measured Solar Radiance Data," International Journal of Photoenergy, vol. 2007, No. 85402, 2007, 9 pages.
Patcharaprakiti et al. "Modeling of Photovoltaic Grid Connected Inverters Based on Nonlinear System Identification for Power Quality Analysis," Electrical Generation and Distribution Systems and Power Quality Disturbances, InTech, Nov. 2011, vol. 21, pp. 53-82.
Perez et al., "A New Operational Satellite-to-Irradiance Model—Description and Validation," Manuscript Submitted to Solar Energy, Apr. 2002, retrieved from http://www.asrc.cestm.albany.edu/perez/publications/Solar%20Resource%20Assessment%20and%20Modeling/Papers%20on%20Resource%20Assessment%20and%20Satellites/A%20New%20Operational%20Satellite%20irradiance%20model-02.pdf.
Wang, "The Application of Grey System Theory in Asset Securitization Project," Journal of Grey System, vol. 19, No. 3, 2007, pp. 247-256, abstract only.
Zhu et al., "Outlier identification in outdoor measurement data: effects of different strategies on the performance descriptors of photovoltaic modules," Proceedings of the 34th IEEE Photovoltaic Specialists Conference, Jun. 7-12, 2009, pp. 828-833.
Notice of Allowance for U.S. Appl. No. 13/253,154, dated Jan. 6, 2014, 10 pages.
Official Action for U.S. Appl. No. 14/326,342, dated Oct. 19, 2017 32 pages.
Official Action for U.S. Appl. No. 14/584,202, dated May 18, 2017 26 pages.
Official Action for U.S. Appl. No. 14/584,202, dated Jan. 4, 2018, 37 pages.
Official Action for U.S. Appl. No. 14/957,374, dated Oct. 12, 2016 9 pages.
Notice of Allowance for U.S. Appl. No. 14/957,374, dated Feb. 15, 2017 7 pages.
Official Action for U.S. Appl. No. 15/702,604, dated Apr. 4, 2019, 10 pages.
Official Action for U.S. Appl. No. 13/729,066, dated Nov. 4, 2015, 6 pages. Restriction Requirement.
Official Action for U.S. Appl. No. 13/729,066, dated Mar. 11, 2016, 16 pages.
Official Action for U.S. Appl. No. 13/729,066, dated Aug. 12, 2016, 22 pages.
Official Action for U.S. Appl. No. 13/729,066, dated Jul. 3, 2017, 25 pages.

(56) References Cited

OTHER PUBLICATIONS

Official Action for U.S. Appl. No. 13/729,066 dated Mar. 9, 2018, 24 pages.
Official Action for U.S. Appl. No. 13/726,066 dated Dec. 3, 2018, 35 pages.

* cited by examiner

| timestamp | modeled power (W) 702 | modeled energy (Wh) 704 |
|---|---|---|
| 2015-1-1 12:00 | 600 | 10 |
| 2015-1-1 12:05 | 660 | 11 |
| 2015-1-1 12:10 | 540 | 9 |

| timestamp | modeled power (W) 802 | modeled energy (Wh) 804 | measured power (W) 806 | measured energy (Wh) 808 |
|---|---|---|---|---|
| 2015-1-1 12:00 | 600 | 10 | 598 | 9.9 |
| 2015-1-1 12:05 | 660 | 11 | 662 | 11.01 |
| 2015-1-1 12:10 | 540 | 9 | 545 | 9.1 |

| timestamp | modeled energy (Wh) 902 | measured energy (Wh) 904 | system underperformance (Wh) 906 | solar azimuth angle 908 | solar elevation angle 910 | system age (years) 912 |
|---|---|---|---|---|---|---|
| 2015-1-1 12:00 | 10 | 9.9 | 9.9 - 10 ~= -.1 | 180 | 23 | 1 |
| 2015-1-1 12:05 | 11 | 11.01 | 11.01 - 11 ~= .01 | 181 | 22.5 | 1 |
| 2015-1-1 12:10 | 9 | 9.1 | 9.1 - 9 ~= .1 | 182 | 22 | 1 |
| ... | | | | | | |
| 2016-1-1 14:10 | 8 | 8.1 | 8.1 - 8 ~= .1 | 192 | 18 | 2 |

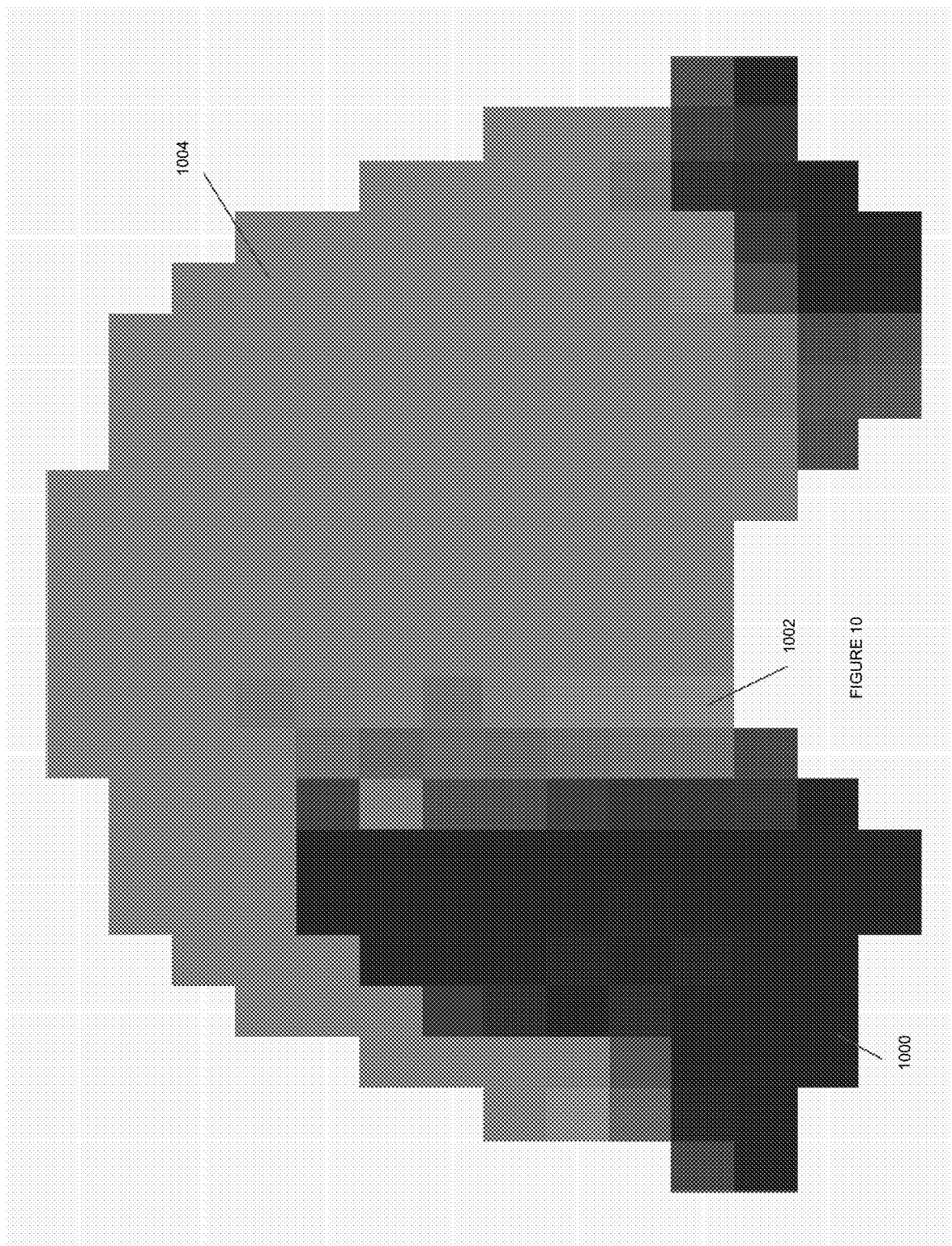

ESTIMATION OF SHADING LOSSES FOR PHOTOVOLTAIC SYSTEMS FROM MEASURED AND MODELED INPUTS

This application claims priority to provisional patent application 62/473,518 filed Mar. 20, 2017. This application is a continuation in part of application Ser. No. 13/729,066 filed Dec. 28, 2012. The patent or application file contains at least one drawing executed in color. Copies of this patent or patent application publication with color drawing(s) will be provided by the Office upon request and payment of the necessary fee.

The installed base of solar photovoltaic (PV) systems in the United States is large and growing rapidly. Viewed as financial assets, these systems are in aggregate an investment worth tens of billions of dollars. Viewed as a fraction of the power generation on the grid, there is enough solar installed in some localities that the generation of these systems has a material impact on efforts to balance the electric grid. Understanding the performance of these systems relative to expectations is critically important to operations and maintenance efforts which rely on being able to quickly and accurately make decisions about whether or not a system is in need of maintenance based on information that can be collected remotely.

Understanding the performance of these systems is also valuable in contexts that include assessing the financial value of any contract that includes payouts based on the performance of solar assets (e.g., leases, PPA's, guarantees, etc.), assessing the value of the underlying solar assets themselves, or assessing the suitably of a location as a location to install solar assets.

Models that estimate the power generation of PV systems are primarily dependent on the size of the system in question, the solar irradiance incident on the system, and the temperature of the PV modules. There are a variety of models of different levels of complexity that are in common usage and their error characteristics have been discussed in a number of academic and industry conferences and publications. These models are typically calibrated in controlled settings however, and can generate modeling errors that are well above the expected modeling errors when PV systems are affected by factors that do not occur in controlled settings. Such factors include soiling, shading, snow cover, and partial hardware failure. The current state of the art for dealing with errors of this type is to use a derate factor which estimates the fraction of the total energy over the lifetime of the system will be lost for this reason and then reduces all power generation estimates by that fraction. Methodologies like this are destined to produce inaccurate results when there are short term fluctuations in the losses that occur for any of these reasons. One particularly simple example of this is that if derates are used to model losses due to snow cover, then the models will necessarily overestimate energy production in a very snowy winter and underestimate production during a winter with lower than normal snowfall. Augmenting the current state of the art PV performance models to include highly granular categorized loss estimates (including shading) enables them to better describe the measured performance of real world systems. This is potentially valuable for a wide variety of applications.

With the proliferation of solar PV systems as a source of energy generation at residential, commercial, and industrial scales, understanding the performance of these systems in the field, and outside of controlled laboratory conditions, is an increasingly important task with a number of important applications. Shading of PV systems is one of the principal drivers of PV systems underperforming their expectations, with residential systems being particularly acutely affected in some cases. Insight into how and when this occurs is therefore an essential piece of efforts to PV system underperformance in general. Since shading is driven by the sun location and the geometry of the sites in question (i.e., it depends on the exact location and size of trees, other buildings, or other panels) and it is often difficult to efficiently obtain complete and correct information about this, we rely on methods that estimate shading by proxy based on data that we are able to collect reliably and economically. This methodology provides logic for such an estimate that integrates a number of relevant measured and modeled inputs.

The present invention describes the methodology to estimate energy losses due to shading in PV systems from data including the measured energy and power produced over the lifetime of the system, the system size and configuration data, the weather conditions (including irradiance, ambient & panel temperature, and wind conditions) over the lifetime of the system, and derived meteorological condition information (e.g., decomposed irradiance values at any time).

These and other features, aspects and advantages of the present invention will become better understood with reference to the following description and claims.

SUMMARY OF THE INVENTION

The present invention relates to a computer processor implemented methods of estimating energy losses due to shading in PV systems.

According to one embodiment of the present invention, a computer processor implemented method of quantifying the energy losses of a photovoltaic system due to shading is provided, the method comprising the steps of: inputting into a computer processor modeled power and energy time series data for a photovoltaic system; inputting into a computer processor measured power and energy time series data for the photovoltaic system, wherein the measured power and energy time series data includes a set of actual data readings and associated measured power and energy time series data timestamps; inputting into a computer processor an age of the photovoltaic system; determining in a computer processor a solar elevation angle and a solar azimuth angle for a set of times to provide a solar elevation angle and solar azimuth angle time series; merging by the computer processor the modeled power and energy time series data with the measured power and energy time series data to determine a difference of modeled power and energy time series data and the measured power and energy time series data to provide an underperformance time series having a set of underperformance time series data points; merging the solar elevation angle and solar azimuth angle time series with the modeled power and energy time series data and the measured power and energy time series data to provide a shading detection time series; determining in a computer processor a beam irradiance incident on a solar panel of a photovoltaic system; calculating a predictor function according to supervised learning techniques that estimate underperformance of the photovoltaic system from the beam irradiance incident on a solar panel of a photovoltaic system, age of the system, the solar elevation angle and the solar azimuth angle; and determining by the computer processor a shading loss time series by applying the predictor function to the shading detection time series.

These and other features, aspects and advantages of the present invention will become better understood with reference to the following description and claims.

BRIEF DESCRIPTION OF THE DRAWINGS

FIG. 7 depicts the present invention;
FIG. 8 depicts the present invention;
FIG. 9 depicts the present invention;
and
FIG. 10 depicts the present invention.

DETAILED DESCRIPTION OF THE INVENTION

Figure 1:
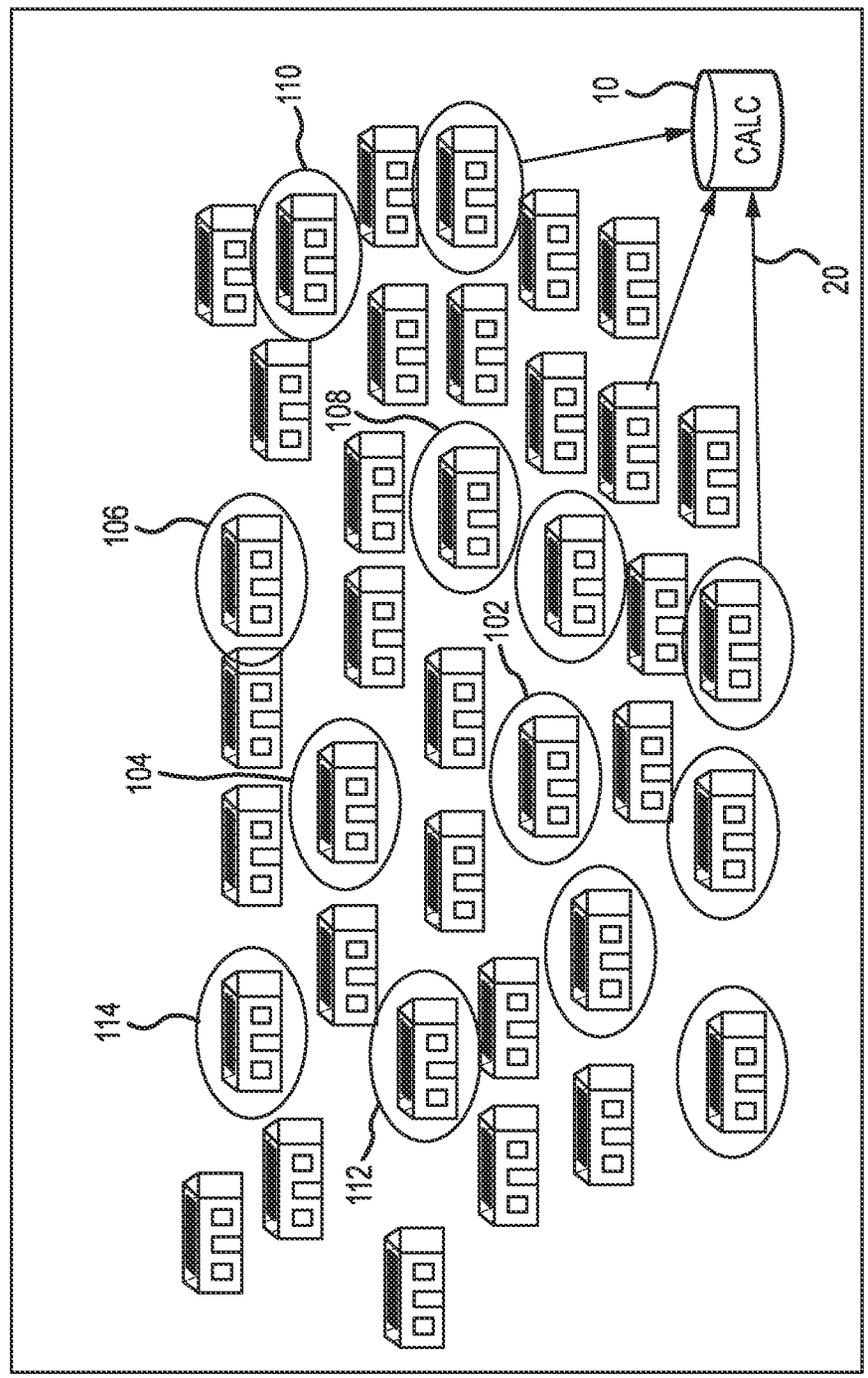
FIG. 1 depicts the present invention.
Figure 2:
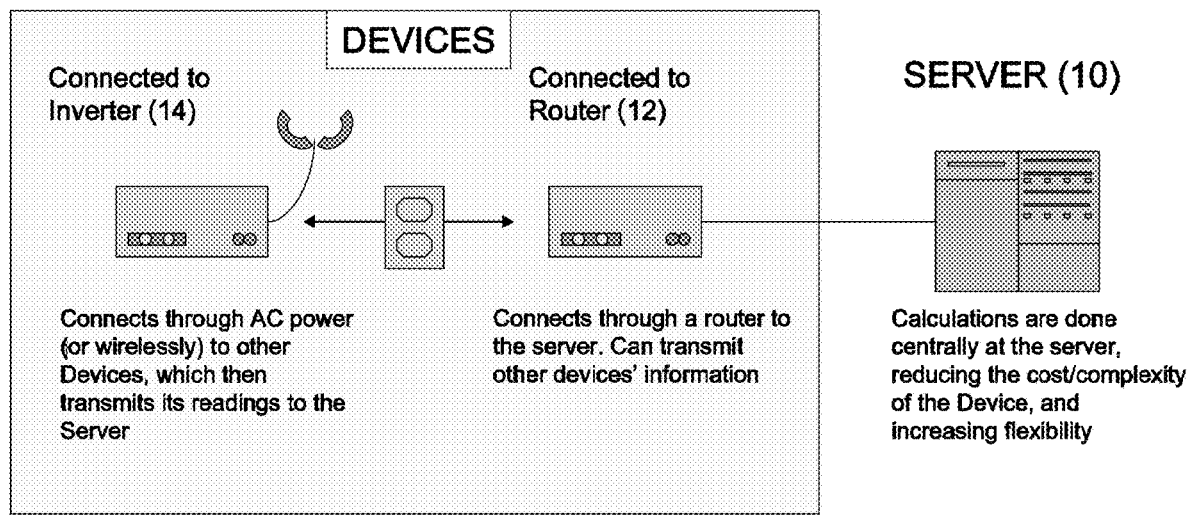
FIG. 2 depicts the present invention.
Figure 3:
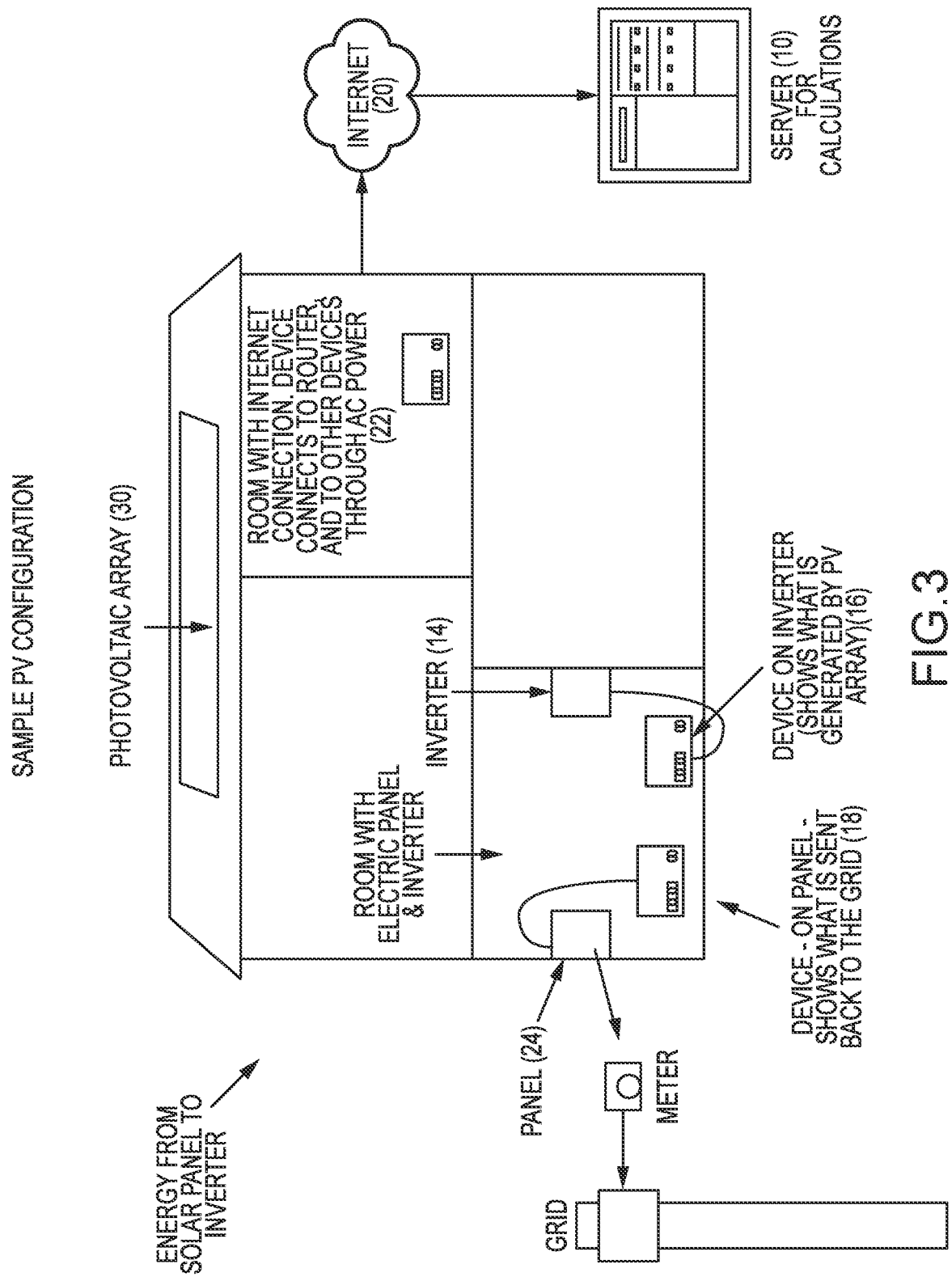
FIG. 3 depicts the present invention.
Figure 4:
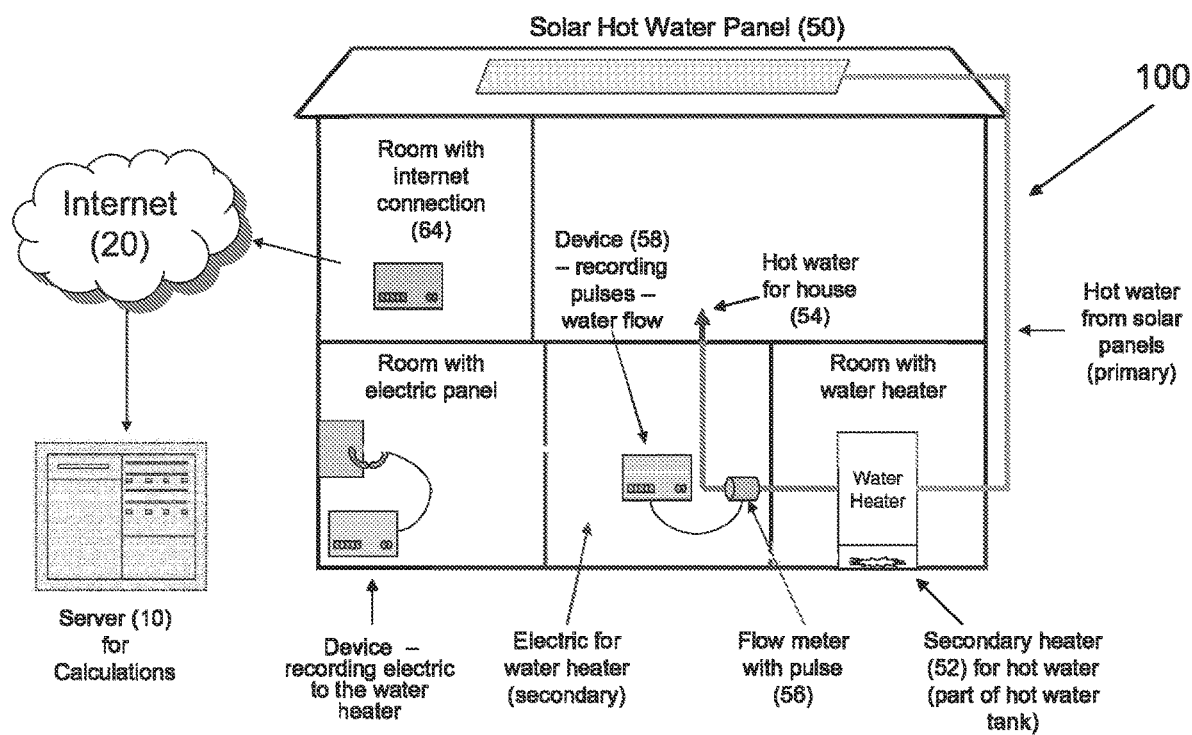
FIG. 4 depicts the present invention.
Figure 5:
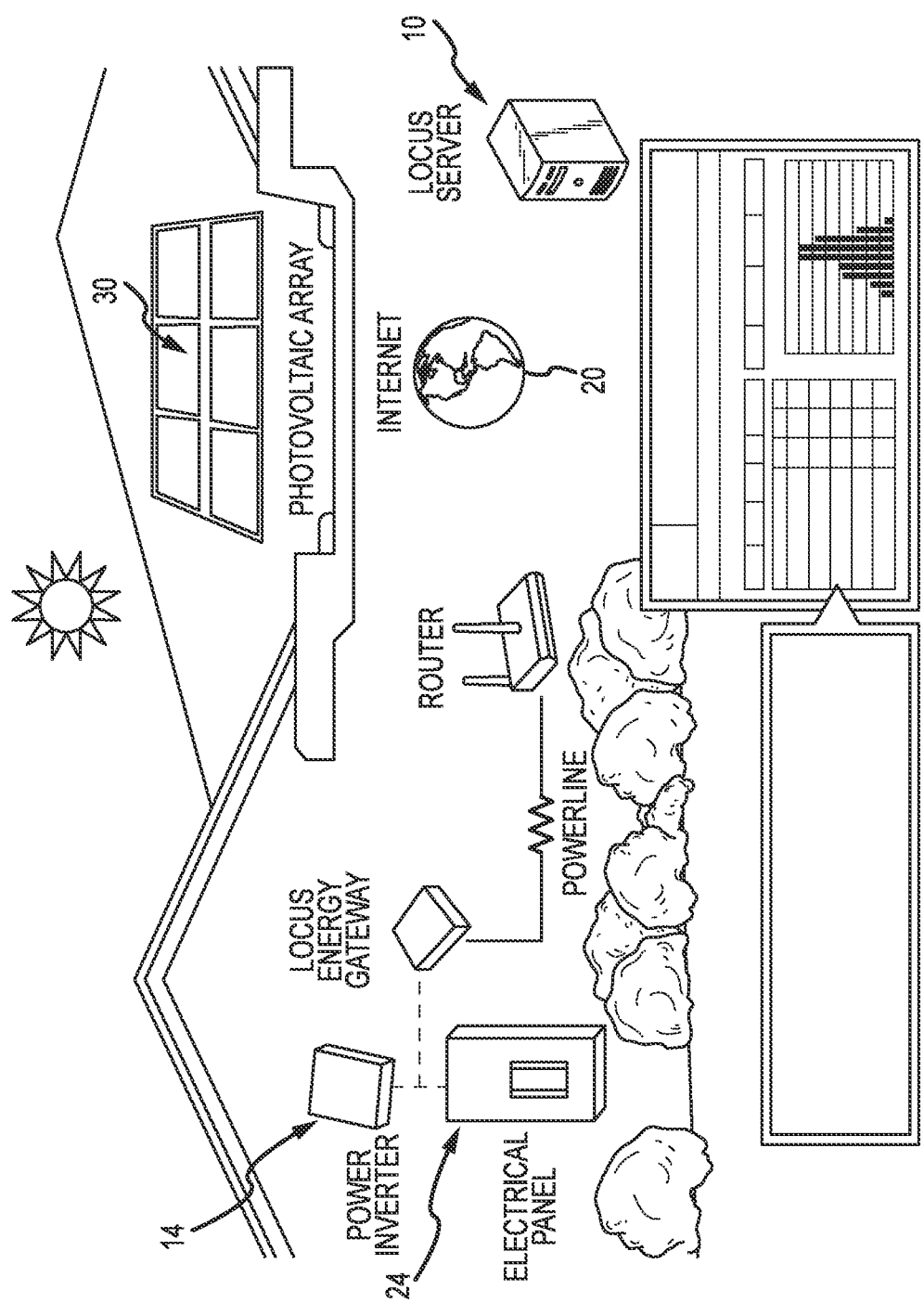
FIG. 5 depicts the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

FIGS. 1-5 provide examples of a monitored renewable energy system (more specifically a photovoltaic array solar panel also referred to herein as a solar photovoltaic system or solar powered system) from which information may be obtained. According to the example shown, there is a server 10 and at least one monitored renewable energy system (e.g. 102, 104, 106, 108, 110, 112) which is provided to a user or consumer. There may be at least one data server (10), at least one generation monitoring device (16) in communication with the monitored renewable energy system (at premise monitored renewable energy system (30)) and at least one communication node (22) in communication with at least one of the monitored renewable energy system (30), the generation monitoring device (16) and the data server (10). It should be understood the data server may be a single computer, a distributed network of computers, a dedicated server, any computer processor implemented device or a network of computer processor implemented devices, as would be appreciated by those of skill in the art. The monitored renewable energy system may have background constants that are entered into the system during data setup; populating this part of the data structure is one of the initial steps to the process. During this time, all required (or potentially required) background information may be loaded into the system. This data will later be used for system calculations and diagnostics. Background constants may include: (1) Full Calendar with sunrise and sunset according to latitude throughout the year; (2) Insolation or 'incident solar radiation': This is the actual amount of sunlight falling on a specific geographical location. There are expected amounts of radiation which will fall on an area each day, as well as an annual figure. Specific Insolation is calculated as kWh/m2/day. The importance of this variable is that it can combine several other Background Constants; and (3) Location Functionality. It is envisioned that some of this information may be input and some may be determined automatically. The proximity of each system to each other system may be determined, and forms a part of the methods used to determine the geographic average of the renewable energy systems. While there are different specific methods of implementing Location Functionality, generally this relies on a large database of locations which are tied to zones. Because the relational distances between the zones are stored within the software, the distances between any two locations can then be easily and accurately calculated.

The term production data refers to any data that is received from the photovoltaic system and/or solar irradiance sensor. The energy generated by each monitored renewable energy system and/or solar irradiance sensor is recorded as production data and the data server may then determine comparative information based upon at least one of the background constant, the diagnostic variable, the system coefficient and the energy generated to determine a comparative value of the monitored renewable energy system. The term comparative value is intended to include any value that compares one system to another system or a group of systems. For example, this may be as simple as an "underperforming" designation when the system's performance is less than another system or group of systems performance in terms of power generated.

A sample system may have a router (12) and at least one inverter (14) in communication with the monitored renewable energy system (e.g. 50, 30). The inverter (14) is an electronic circuit that converts direct current (DC) to alternating current (AC). There may also be at least one return monitor (18) (associated with electric panel (24)) determining the energy returned to a grid by the at-least one monitored renewable energy system. At least one background constant may be determined and saved in the data server(s). The monitored renewable energy system (e.g. 30, 50) may be at least partially powered by at least one alternate energy source. There may be at least one generation monitoring device (e.g. 58), which calculates the energy generated at each consumer's premises by the monitored renewable energy system (e.g. 30, 50); at least one communication node (64) in communication with each at least one generation monitoring device (e.g. 58); at least one data server (10) in communication with communication node (e.g. 64), wherein the data server(s) (10) accept information from the communication node (e.g. 64) to determine the power generated at a first user's premises (100) and compare the power generated at a first user's premises (100) to Comparative Information obtained from at least two monitored renewable energy systems (e.g. 102, 104, 106, 108, 110, 112, 114) to determine if the first user's monitored renewable energy system (100) is within a predetermined deviation from the comparative information. This may provide a comparative value. The communication node may be further comprising a data storage means for storing usage information. For example, the communication node (64) may be a computer with a hard drive that acts as a data storage means for storing usage information. The generation monitoring device may be selected from the group consisting of pulse meter, temperature meter, electromechanical meter, solid state meter, flow meter, electric meter, energy meter and watt meter. There may also be at least one return monitoring device in communication with the inverter which calculates the energy returned to a grid by the system.

The monitored renewable energy system may be, for example, a solar system, solar panel system, photovoltaic, thermal, wind powered, geothermal, hydropower. A secondary energy source (e.g. 52) may be in communication with and at least partially powering the monitored renewable energy system. It should be understood, though, this is only for ancillary power in the event that the renewable energy source (50) is not capable of entirely powering the at premise monitored renewable energy system.

The generation monitoring device may be any type of meter, by way of example, this may include a pulse meter, temperature meter, electromechanical meter, solid state meter, flow meter, electric meter, energy meter and watt meter. An installation will have a communication node or hub set up at the location with the system. One of the communication nodes may act as a hub. These devices connect to the internet (20) and send the data collected by the nodes to the server (10). They have the following properties: The hub has a web server and connects to a standard internet connection (Ethernet). It does not require a computer or other device to make this connection. Each hub has its own unique IP or DNS address. The hub is configured by a web browser. The web browser allows the hub to have specific nodes assigned to it. This set up feature will allow another hub in the area to be set up with its own nodes so that all can operate wirelessly without disruption. Also, the hub is able to configure specific aspects of the hub, such as the connection with the server, data recording and time settings and the ability to configure the attached nodes, including their recording properties.

Each installation may have two or more Data Nodes. These are typically connected wirelessly to the Hub, and connected directly to the inputs/outputs from the Solar Hot Water system (50). They communicate constantly with the Hub, transferring data which the Hub then sends up to the server (10). They may have the following properties: The first Required Node connects to a flow meter (56) attached to the Water Tank that is connected to the Solar Hot Water system. This Node will operate as a pulse meter, 'clicking' whenever a unit (either a gallon or a liter) of hot water passes from the tank. The second Required Node connects to either the electric panel at the switch for the Hot Water tank's electric power OR to a flow/other meter for gas/oil to the secondary heater for the Hot Water tank. The Node may have a data storage means for storing flow/usage information. Together, the data gathered from these Required Node connections allow the software on the serve to convert the utilized hot water into an accurate reading of utilized solar energy by subtracting the energy required to by the secondary heating mechanism. The term utilized generation refers to the energy generated by the at-premise power system, less any energy that has not been consumed by the at premise power system (e.g. the energy used to heat water that remains in the tank and is not subsequently used). Note that the term "at-premise power system" is one type of monitored renewable energy system, as claimed. There may also be other Nodes, which may be used to measure other aspects of the system and gain even more accurate readings. For example: the temperature of the hot water on an ongoing basis. The system may be monitored from a remote location (such as a computer in a different location).

The components node (100), hub (102) and server (10) make up the required core components needed to accurately measures the actual usable output from a Solar Hot Water (SHW) system. Essentially, the hub (102) connects to multiple nodes (100) which simultaneously measure the secondary power going into the system along with the hot water going out (54). Controlling for any background power requirements (e.g. for pumping), it can measure the usable BTUs created by solar by analyzing the measurements at the server (10) level.

Before installing a photovoltaic system in a given location, an estimate of performance expectations is created considering the locational context, typical climate and proposed equipment. Performance expectation estimates also employ assumptions regarding factors that could reduce performance, such as shading, equipment mismatch, and soiling. Properly choosing these assumptions is one of the more difficult aspects of system modeling. Measured performance of an installed system is often compared against the performance expectations to understand if a photovoltaic system is functioning properly.

Figure 6:
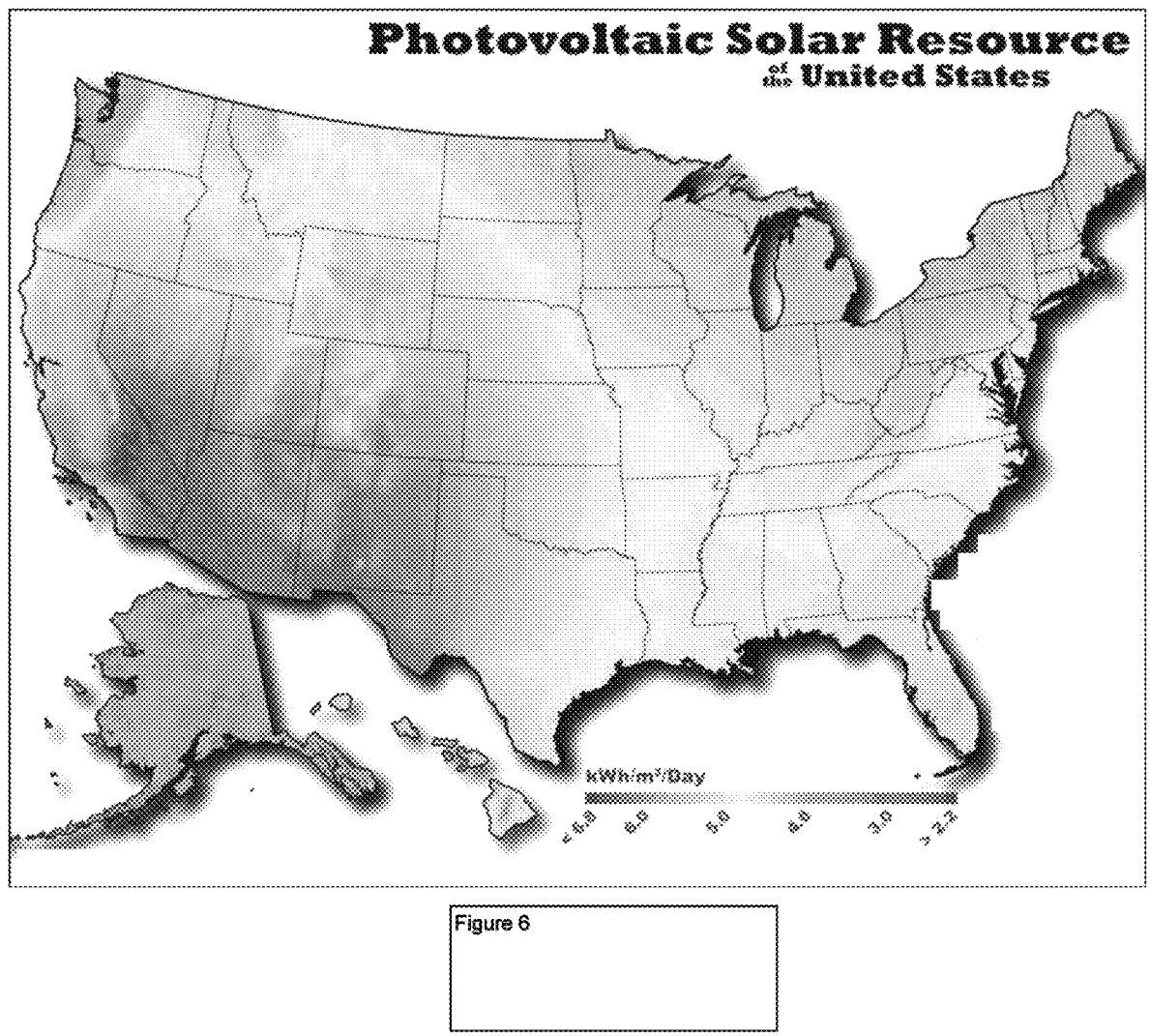
FIG. 6 depicts the present invention.

Shading and soiling losses reduce the incoming incident irradiance that strikes the PV panel. Cell temperature is either directly measured by a weather station on site, or calculated using incident irradiance, ambient temperature, and wind speed. FIG. 6 depicts a photovoltaic resource map. As can be seen, the southwestern portion of the United States has the greatest potential photovoltaic resources.

The present invention provides a process and logic that estimates the amount by which the energy generation of a solar photovoltaic (PV) system is reduced by panel soiling from the measured energy and power produced over the lifetime of the system, the system size and configuration data, the weather conditions (including irradiance, precipitation, ambient and panel temperature, and wind conditions) over the lifetime of the system, and derived meteorological condition information (e.g., the history of clear-sky conditions at the location of the site)

The Methodology is comprised of the following background variables, input parameters and logic based on those variables.

MEASURED POWER AND ENERGY DATA: This data is measured with an on-site physical sensor installed with a PV system or within the inverter.

SYSTEM CONFIGURATION DATA: This data describes the size, orientation (tilt and azimuth angles for the panels), age, and location of the system.

IRRADIANCE DATA: On-site measured irradiance data and/or satellite modeled irradiance data.

WEATHER DATA: This includes temperature and/or wind conditions data from on-site and/or nearby weather stations.

MODULE TEMPERATURE DATA: measured data from sensors on individual PV modules.

DECOMPOSED IRRADIANCE DATA: Time series data that can be derived from the irradiance data using algorithms that have appeared in publicly available academic literature. This data describes what fraction of the incident irradiance at any given time is direct vs. what fraction is diffuse. Commonly referred to as direct normal irradiance (DNI) and diffuse horizontal irradiance (DHI) in the literature.

MODELED POWER AND ENERGY DATA: Estimates of what the power and energy production of the PV system would have been in the absence of shading. This should be calculated using industry standard best practices in PV system performance modeling.

The modeled power and energy time series data should be calculated from the irradiance data, weather data, and system configuration information using industry standard power and energy generation PV modeling techniques.

A computer processor implemented method of quantifying the energy losses of a photovoltaic system due to shading, the method comprising the steps of: inputting into a computer processor modeled power and energy time series data for a photovoltaic system. This is depicted in FIG. 7, timestamps (700), modeled power (702) and modeled energy (704). The modeled power and energy time series data may be calculated from irradiance data weather data and system configuration information. The modeled power and energy time series data may be calculated from irradiance data, weather data and system configuration information and provides an estimate of what the power and energy production of a photovoltaic system would be in the absence of shading. The modeled power and energy time series data may be according to configuration data, wherein the configuration data includes at least one of size of the photovoltaic system, orientation of the photovoltaic system and location of the photovoltaic system.

There may be the step of inputting into a computer processor measured power and energy time series data for the photovoltaic system, wherein the measured power and energy time series data includes a set of actual data readings and associated measured power and energy time series data timestamps. The measured power and energy time series data may be measured with an on-site physical sensor installed in a photovoltaic system or an inverter. the measured power and energy time series data includes measured irradiance data. The measured power and energy time series data may be according to at least one of solar irradiance data at the location of the photovoltaic system, weather data including temperature, wind conditions and precipitation at the location of the photovoltaic system, module level measured temperature data; snow depth and precipitation data for the location of the PV system. FIG. 8 depicts merged data, wherein the series is merged by timestamp (800) and includes modeled power (802), modeled energy (804), measured power (806) and measured energy (808). The measured and modeled energy time series need to be merged so that the difference of these two time series can be calculated. Call this time series of difference the system underperformance time series.

There may be the step of inputting into a computer processor an age of the photovoltaic system (912) and determining in a computer processor a solar elevation angle (910) and a solar azimuth angle (908) for a set of times (900) to provide a solar elevation angle and solar azimuth angle time series. The solar elevation angle and solar azimuth angle that jointly specify the location of the sun of the sky at any time given a location need to be calculated. These values can be calculated using known astronomical formulas.

The time series refers to the series of entries for each category. The step of merging by the computer processor the modeled power and energy time series data with the measured power and energy time series data to determine a difference of modeled power and energy time series data and the measured power and energy time series data to provide an underperformance time series (906) having a set of underperformance time series data points. The set of underperformance time series data points is made up of the data points (e.g. 702, 704, 802, 804, 806, 808, 902, 904). The solar elevation angle (910) and solar azimuth angle (908) time series are merged with the modeled power and energy time series data and the measured power and energy time series data to provide a shading detection time series. The solar elevation and solar azimuth calculations are astronomical calculations. NOAA maintains a calculator online that show how the calculation works https://www.esrl.noaa.gov/gmd/grad/solcalc/ Next the beam irradiance incident on a solar panel of a photovoltaic system is determined. Angle of incidence=angle between direction the PV panel is facing and direction from panel to the sun. DHI=direct normal irradiance is the irradiance measured by an irradiance sensor pointed directly at the sun. (i.e., as opposed to pointed directly upwards, or pointed in the same direction the panel is facing):

beam irradiance=cosine (angle of incidence)*$dni$

The beam irradiance is then a fraction of the plane of array irradiance (The plane of array irradiance is measured if the sensor is pointed in the same direction as the panel). Then, let beam energy=modeled energy*(beam irradiance/plane of array irradiance) i.e., the portion of the energy due to beam irradiance. Splitting the beam energy apart is important because shading should only affect the beam irradiance and not the diffuse irradiance (i.e., light that has bounced off of things like clouds before it hits the PV panels). The beam irradiance incident on the panel at any point in time is calculated using astronomical formulas using the DNI and the angle of incidence between the solar panel in question and the current sun location in the sky.

The next step is calculating a predictor function according to supervised learning techniques that estimate underperformance of the photovoltaic system from the beam irradiance incident on a solar panel of a photovoltaic system, age of the system, the solar elevation angle and the solar azimuth angle. First, we split the time series into buckets by grouping similar azimuth and elevation angles. For example, all the rows above where solar elevation is between 20 and 25 and the solar azimuth is between 180 and 185 could be one bucket. That is, we group based on the location of the sun in the sky as the solar elevation and azimuth jointly describe the apparent position of the sun in the sky. The first 3 rows in the example time series listed above will be in one bucket and the final value will be in a different one. FIG. 10 is a visualization of what this will look like. The specific image shows larger energy losses in darker blue (1000) on the left side of the image due to a large tree near the panel in question. The gray region (1004) shows all the possible locations of the sun in the sky where we didn't see significant shading. Lighter blue (1002) is minimal shading.

There may be the steps of calculating a second predictor function and applying the second predictor function to the shading detection time series. The second predictor function is a composite of sub-predictors calculated for a similar group of solar elevation angles and solar azimuth angles. The second predictor function may be another predictor function that is a composite of sub-predictors calculated for each bucket. Each sub-predictor is calculated by finding (for that bucket) the linear regression of the system underperformance onto the beam energy and system age. If the r squared values for the regression are above a certain threshold, then we assume that there is shading occurring in that bucket. The sub-predictor then estimates the shading loss using the fitted value from the regression for that beam energy and system age.

The exact threshold to use here should vary depending on how tolerant the system users are to false positives or false negatives. If false negatives are a bigger issue, then the threshold should be lower & vice-versa. We chose a final value based on user feedback. The predictor function is essentially a combination of linear regressions calculated separately for the buckets (similar group of solar elevation angles and solar azimuth angles) and subjected to thresholds about their explanatory power. We then apply this predictor to the entirety of the time series to estimate shading for every timestamp. The method provides determining by the computer processor a shading loss time series by applying the predictor function to the shading detection time series.

There may be the steps of calculating a second predictor function and applying the second predictor function to the shading detection time series. The second predictor function may be a composite of sub-predictors calculated for a similar group of solar elevation angles and solar azimuth angles. The sub-predictor may be calculated by finding, for the similar group of solar elevation angles and solar azimuth angles, a linear regression of the estimated underperformance onto the beam irradiance incident on a solar panel of a photovoltaic system and the age of the system. If the r squared values for the regression are above a certain threshold, shading is assumed for the similar group of solar elevation angles and solar azimuth angles The second predictor function then estimates the shading loss using a fitted value from the regression for that beam irradiance incident on a solar panel of a photovoltaic system and the age of the system. There may also be the steps of applying thresholds to ensure shading is only identified upon analysis which indicates a location of the sun in the sky, system age and beam energy are strong predictors of system underperformance.

The present invention is utilized to quantify energy losses due to shading for a PV system. Applying the methodology described herein to data collected for a PV system will generate estimates of the energy losses due to shading. Potential uses of this information include: Validating design (i.e., pre-build) estimates of the expected shading losses for a PV system, both during initial production years and over the long-term useful lifetime of the system (20+ years) to assess how well these estimates hold up in the face of a changing environment. Improving methodologies for calculating design estimates of expected shading losses for a PV system, both in the early years and over the long-term useful lifetime of the system. Verifying guarantees about the level of shading losses for a PV system. Determining a cause for PV systems underperforming contractual performance guarantees.

The present invention may also be utilized to quantify monetary losses due to shading for a PV system. Once an estimate of the energy losses due to shading for a PV system are in place it is possible to estimate the monetary losses incurred due to this lost energy production using an electricity price rate schedule for the location in question. There are a number of potential uses for this information including: Tree trimming/removal planning: Once a dollar value has been placed on the value of shading losses for a period, it is possible to determine whether or not it would have been an economical decision to either trim or remove a tree. Loss/damage assessment due to changes in the environment: Once a loss value has been quantified, it can be used to assess the financial impact of changes in the environment, e.g., from tree growth, new tree additions, construction of a new building or other physical structure. Attributing a cause to monetary losses due to PV systems underperforming guaranteed performance levels.

The present invention may be utilized to Identify shading as a major contributor to system losses. Once an estimate of the energy losses due to shading for a PV system are in place it is possible to assess the significance of these losses in the context of overall production. There are a number of potential uses for this information, including: Contract (e.g., insurance, warranty claim, and performance guarantee) validation or exclusions: Shading may be a covered or excluded loss under a contract, so the algorithm can be used to remotely assess contract impact. Significant changes in shading contribution to overall system losses over time indicates significant changes in the surrounding environment (e.g., tree growth, tree addition, new buildings or other physical structures). These changes in the environment may trigger a more detailed review of the site by the PV system owner, without the owner having to physically visit all their remote sites to initially identify these types of issues.

The present invention may be utilized to forecast the energy (monetary) losses due to future shading. Similar to the previous case, but using the information that we have that predicts shading losses from sun location, system age, and irradiance, we can then use historical climatological data to predict future energy (and therefore monetary) losses due to shading at a site under the assumption that nothing changes about the geometry of the site. Potential uses include: It can inform decisions about whether or not a tree(s) that are shading a PV system should be removed by quantifying the future estimated losses that could potentially be recouped. It can be utilized by the homeowner to better make decisions about energy usage patterns. (e.g. if may make sense to engage in energy intensive activity when the solar system is operating at full capacity, then knowing when it will be shaded is useful information.) This information could also be utilized by home automation technologies. Assessing the risk in or assessing the value of performance guarantees on the energy production of a PV system. Assessing the value of solar PV assets: estimates of the future shading losses of a site can be used as an input to more precisely assess the value of a solar PV asset. This can be applied to individual PV system, fleets of solar assets or interests therein, or to PV assets sold as part of a larger residential or commercial real estate transaction. Assessing the value of financial products collateralized against residential or commercial real estate that includes a PV system: Installing a PV system on a residential or commercial building will change the value of that property, and estimates of future shading losses can be used to more accurately assess that change. Any financial product collateralized against such a property can then be more accurately valued if the value of the PV system that is a part of the collateral can be more precisely valued.

PV System Underperformance Detection: Detecting when and why PV systems are underperforming based on their energy generation is a challenging task for a variety of reasons. One of the main reasons is that a large number of factors (including shading) can affect system performance. This dramatically complicates efforts to detect when a PV system is underperforming for a reason where corrective action can profitably be taken. Accurate estimates of the degree to which a PV system is shaded will make this task easier by removing a major confounding factoring that could otherwise hinder the performance of a system which detects underperforming PV systems from their energy generation data.

Shading Maps: Applying the methodology described here to the energy generation history of a large and geographically distributed fleet of systems should be able to generate maps that show to what extent different geographies are affected by shading in different seasons. Uses include: Solar permitting, grid operations & planning: Knowledge of typical shading levels across a representative sample of PV systems could allow grid operators to more precisely predict the effect that deployment of solar assets on the overall operation of the electric grid. This information could be used in the context of predicting the effects for the grid of issuing more permits for solar generation resources. Assessing the value of non-solar electrical generation resources. Continuing the previous point, if this information is useful in assessing the impact of solar generation on the grid, this information can also be used to inform energy price estimates and expected utilization levels for non-solar energy generation resources (e.g., coal or natural gas power plants).

The present invention provides systems and methods for the estimation of PV system energy losses due to panel shading based on measured power & energy data for the system; configuration data describing the size, orientation and location of the system; solar irradiance data at the location of the PV system; weather data including temperature, wind conditions and precipitation at the location of the PV system; module level measured temperature data; and modeled power and energy data for the system.

It should be understood that the foregoing relates to preferred embodiments of the invention and that modifications may be made without departing from the spirit and scope of the invention as set forth in the following claims.

We claim:

1. A method of monitoring a photovoltaic system and quantifying the energy losses due to shading, comprising:
   providing a computer system with a processor;
   inputting into the computer processor modeled power and energy time series data for a photovoltaic system at a location;
   receiving measured power and energy time series data for the photovoltaic system, wherein the measured power and energy time series data includes a set of actual data readings and associated measured power and energy time series data timestamps;
   inputting the measured power and energy time series data into the computer processor;
   inputting into the computer processor an age of the photovoltaic system;
   determining by the computer processor a solar elevation angle and a solar azimuth angle at the location of the photovoltaic system for a set of times to provide a solar elevation angle and solar azimuth angle time series;
   merging by the computer processor the modeled power and energy time series data with the measured power and energy time series data to determine a difference of modeled power and energy time series data and the measured power and energy time series data to provide an underperformance time series having a set of underperformance time series data points;
   merging the solar elevation angle and solar azimuth angle time series with the modeled power and energy time series data and the measured power and energy time series data to provide a shading detection time series;
   determining by the computer processor a beam irradiance incident on a solar panel of a photovoltaic system;
   calculating a predictor function according to supervised learning techniques that estimate underperformance of the photovoltaic system from the beam irradiance incident on a solar panel of a photovoltaic system, age of the photovoltaic system, the solar elevation angle and the solar azimuth angle, wherein during the calculating of the predictor function the time series data is grouped by solar azimuth angle and solar elevation angle; and
   determining by the computer processor a shading loss time series by applying the predictor function to the shading detection time series.

2. A method as in claim 1, further comprising calculating a second predictor function and applying the second predictor function to the shading detection time series.

3. A method as in claim 2, wherein the second predictor function is a composite of sub-predictors calculated for a similar group of solar elevation angles and solar azimuth angles.

4. A method as in claim 3, wherein the sub-predictor is calculated by finding, for the similar group of solar elevation angles and solar azimuth angles, a linear regression of the estimated underperformance onto the beam irradiance incident on a solar panel of a photovoltaic system and the age of the photovoltaic system.

5. A method as in claim 4, wherein if the r squared values for the regression are above a certain threshold, shading is assumed for the similar group of solar elevation angles and solar azimuth angles.

6. A method as in claim 5, wherein the second predictor function then estimates the shading loss using a fitted value from the regression for that beam irradiance incident on a solar panel of the photovoltaic system and the age of the photovoltaic system.

7. A method as in claim 1, further comprising:
   applying thresholds to ensure shading is only identified upon analysis which indicates a location of the sun in the sky, photovoltaic system age and beam energy are predictors of photovoltaic system underperformance.

8. A method as in claim 1, wherein the modeled power and energy time series data is calculated from irradiance data, weather data and photovoltaic system configuration information.

9. A method as in claim 1, wherein the measured power and energy time series data is measured with an on-site physical sensor installed in a photovoltaic system or an inverter.

10. A method as in claim 1, wherein the modeled power and energy time series data is calculated from irradiance data, weather data and photovoltaic system configuration information and provides an estimate of what the power and energy production of the photovoltaic system would be in the absence of shading.

11. A method as in claim 1, wherein the measured power and energy time series data includes measured irradiance data.

12. A method as in claim 1, further comprising assessing the impact of the energy losses due to shading on a contact associated with the photovoltaic system.

13. A method as in claim 1, wherein the modeled power and energy time series data is according to configuration data, wherein the configuration data includes at least one of size of the photovoltaic system, orientation of the photovoltaic system and location of the photovoltaic system.

14. A method as in claim 1, wherein the measured power and energy time series data is according to at least one of solar irradiance data at the location of the photovoltaic system, weather data including temperature, wind conditions and precipitation at the location of the photovoltaic system, module level measured temperature data, snow depth and precipitation data for the location of the photovoltaic system.

15. A method as in claim 1, wherein one group of the time series data includes time series data for which the solar elevation angle is between 20° and 25° and the solar azimuth angle is between 180° and 185°.

16. A method as in claim 1, further comprising assessing the validity of a prediction of shading losses for the photovoltaic system based on the shading loss time series determined by the computer processor.

17. A method as in claim 1, wherein the beam irradiance incident on the solar panel is determined by multiplying direct normal irradiance measured by an irradiance sensor pointed directly at the sun by cosine of an angle of incidence of the solar panel.

18. A method as in claim 1, further comprising determining in a computer processor a beam energy incident on the solar panel, wherein the beam energy is a portion of energy due to beam irradiance.

19. A method of monitoring a photovoltaic system and quantifying the energy losses due to shading, comprising:
- providing a computer system with a processor;
- inputting into the computer processor modeled power and energy time series data for the photovoltaic system;
- receiving measured power and energy time series data for the photovoltaic system, wherein the measured power and energy time series data includes a set of actual data readings and associated measured power and energy time series data timestamps;
- inputting the measured power and energy time series data into the computer processor;
- inputting into the computer processor an age of the photovoltaic system;
- determining by the computer processor a solar elevation angle and a solar azimuth angle at the location of the photovoltaic system for a set of times to provide a solar elevation angle and solar azimuth angle time series;
- merging by the computer processor the modeled power and energy time series data with the measured power and energy time series data to determine a difference of modeled power and energy time series data and the measured power and energy time series data to provide an underperformance time series having a set of underperformance time series data points;
- merging the solar elevation angle and solar azimuth angle time series with the modeled power and energy time series data and the measured power and energy time series data to provide a shading detection time series;
- determining by the computer processor a beam irradiance incident on a solar panel of a photovoltaic system;
- calculating a predictor function according to supervised learning techniques that estimate underperformance of the photovoltaic system from the beam irradiance incident on a solar panel of a photovoltaic system, age of the photovoltaic system, the solar elevation angle and the solar azimuth angle;
- determining by the computer processor a shading loss time series by applying the predictor function to the shading detection time series;
- calculating a second predictor function and applying the second predictor function to the shading detection time series, wherein:
  - the second predictor function is a composite of sub-predictors calculated for a similar group of solar elevation angles and solar azimuth angles;
  - the sub-predictor is calculated by finding, for the similar group of solar elevation angles and solar azimuth angles, a linear regression of the estimated underperformance onto the beam irradiance incident on a solar panel of a photovoltaic system and the age of the photovoltaic system; and
  - shading is assumed for the similar group of solar elevation angles and solar azimuth angles when the r squared values for the regression are above a certain threshold.

20. A method as in claim 19, wherein during the calculating of the predictor function the time series data is grouped by solar azimuth angle and solar elevation angle such that one group includes time series data for which the solar elevation angle is between 20° and 25°.

* * * * *